Patented Mar. 8, 1938

2,110,205

UNITED STATES PATENT OFFICE 2,110,205

PROCESS OF MAKING EXTRACT OF CAS-
CARA SAGRADA OR THE LIKE

Edward D. Davy, Cleveland Heights, Ohio

No Drawing. Application December 1, 1934, Serial No. 755,589. Renewed March 27, 1937

14 Claims. (Cl. 87—28)

This invention relates to the debitterization of the drug from *Rhamnus purshiana* (cascara sagrada), or other species of the genus Rhamnus.

An object of the invention is to debitterize the products extracted from *Rhamnus purshiana* or other species of the genus Rhamnus or to debitterize suspensions of the drug in water.

Another object of the invention is to provide a simple and efficient process for debitterizing such drugs, and particularly the products of cascara sagrada, and to retain the cathartic properties thereof.

A further object of the invention is to provide a debitterized extract of cascara sagrada in which its cathartic activity is not substantially impaired and to provide an extract which does not have the effect of causing a griping action when used physiologically.

These and other objects of the invention will be readily apparent to those skilled in the art from the description herein.

Attempts have been made in the past to debitterize cascara sagrada by treatment of the drug with magnesium oxide, calcium oxide, or hydroxides of the same, in the presence of sufficient water to moisten the drug and exposing the moistened drug to the air. Such processes, while debitterizing cascara sagrada, have, however, so affected the constituents that the cathartic effect of the drug has been materially reduced, as compared to the bitter extract of the same relative drug strength.

According to my process it is possible to completely debitterize the products of cascara sagrada without substantially impairing their cathartic activity.

In carrying out my process it will be described in connection with cascara sagrada, which is the most important one of the species above referred to. The dry cascara sagrada bark, preferably in the form of a coarse powder, is treated with hot or boiling water, preferably in the ratio of about 1 part of the bark to about 5 parts of the water and macerated 2 or more hours in a suitable receptacle, such as a percolator. When the maceration is complete the percolation is started and continued with hot water until the drug is exhausted. The percolate is reduced in volume by evaporation, or any other suitable manner, until the volume of the percolate contains the equivalent of approximately 1 gram of drug in 1 c. c. of liquid extract.

To the concentrated percolate which contains the extractive of the drug is added a quantity of yeast, such as 20 to 30 grams for each 1000 c. c. of liquid extract. It is to be understood that the exact quantity of yeast is not necessarily a fixed amount, as the yeast cells will multiply rapidly under favorable food and temperature conditions. I have found that a desirable temperature for carrying on the fermentation is between 35° C. and 40° C. Fermentation proceeds rapidly and is allowed to proceed to substantial completion, which usually occurs in from 1 to 3 days, depending upon temperature conditions and the activity of the yeast.

The fermentation is preferably conducted in a closed receptacle with an outside tube leading through water for escape of the carbon dioxide gas. This avoids the entrance of contaminating substances and also atmospheric oxygen.

After the fermenation is completed the mixture is reduced to dryness in any suitable manner, such as by the application of heat, with or without reduced pressure, to eliminate volatile products resulting from fermentation. Water is then added to the dry residue in the desired amount. If it is desired to make a liquid extract having the proportion of 1 gram of the drug to 1 c. c. of the finished product, it is desirable at this point in the process to add approximately .7 c. c. of water to 1 gram equivalent of the original drug. The mixture is made alkaline by the addition of any suitable alkali, or alkaline material, such as, for example, alkali hydroxides or carbonates, calcium oxide or hydroxide, or magnesium oxide or hydroxide, or mixtures of alkaline materials.

It is usually preferable to use magnesium oxide or hydroxide to render the mixture alkaline because the presence of magnesium in the resultant product is desirable, as magnesium itself improves the laxative qualities of the product.

When magnesium oxide is used it may be added in approximately the amount of 75 to 100 grams to each liter of solution. It is also desirable to add approximately 2 grams of sodium or potassium hydroxide or other alkalies to each liter of solution to aid in dissolving the active cathartic principle of the drug in the presence of magnesium hydroxide.

After rendering the mixture alkaline it is desirable to aerate the mixture by passing air through it for several hours. Such treatment has the effect of removing any bitterness that may still be present in the mixture and has the effect of substantially preventing griping action when the product is used physiologically.

Instead of aerating the mixture, the mixture may be treated with oxygen or oxidized in some other suitable manner which will complete the debitterization of the extract and modify it so as to prevent the griping action referred to.

After the oxidation has been completed a preservative may be added to the mixture and the product clarified in any suitable manner, such as by sedimentation and filtration, or by filtration. It is usually preferable to add alcohol to the mixture in the desired amount, such as about 20%, to serve as a preservative, although other preservatives may be used.

In the event it is desired to make an aromatic cascara, representing 1 gram of drug in 1 c. c. of finished product, any suitable flavoring material and sweetening agent, such as sugar or saccharin, or both, may be added, and sufficient water to make the correct volume.

In the event a pilular or powdered extract is desired, the filtrate is concentrated by distillation or evaporation to the desired degree.

Because of the complex nature of the products extracted from cascara sagrada and also the complexity of the reactions resulting from enzyme action, it is not known exactly what changes are brought about by the fermenation or the aeration. Fermentation, in addition to eliminating the free sugar, is believed to act upon and substantially eliminate the major part of the sugar normally occurring in combination as a glucoside or glucosides present in the extract.

When the cascara sagrada has been fermented and subsequently made alkaline by the addition of magnesium oxide or hydroxide the bitter taste is materially reduced or may be completely removed.

However, it is desirable to aerate or otherwise oxidize the extract in order to modify the extract so that the tendency toward griping when used physiologically is removed and to complete the debitterization if it has not already been completed.

While it is preferable to carry on the debitterization of the drug as previously described, it is to be understood that the drug can be suspended in water and the fermentation step carried on before percolation.

The process disclosed herein has been described more particularly in connection with cascara sagrada, but it is to be understood that the process is applicable to other species of the genus Rhamnus or other drugs of a similar type which would be susceptible to treatment by this process. It also will be understood that where the term "cascara sagrada" is used in both the specification and claims it is intended to include other cathartic drugs which respond to the process disclosed and claimed herein.

Furthermore, it is to be understood that the particular compounds disclosed, and the procedure set forth, are presented for purposes of explanation and illustration, and that various equivalents can be used and modifications of said procedure can be made without departing from my invention as defined in the appended claims.

What I claim is:

1. In the process of debitterizing cascara sagrada or the like, the steps of treating the bark with water and fermenting, and preparing a liquid extract therefrom.

2. In the process of making a debitterized liquid extract of cascara sagrada or the like, the steps of treating the bark with water and performing in optional succession the steps of fermenting and preparing a liquid extract from the mixture of the bark and water.

3. In the process of making a debitterized extract of cascara sagrada or the like, in which a percolate of the bark is prepared, the step of fermenting the percolate.

4. In the process of making a debitterized extract of cascara sagrada or the like, in which a percolate of the bark is prepared, the steps of fermenting the percolate, preparing a liquid extract therefrom, and aerating the extract.

5. In the process of making a debitterized extract of cascara sagrada or the like, in which the bark is macerated and percolated, the steps of fermenting, reducing the fermented mixture to dryness, making an aqueous alkaline extract from the residue, and submitting the extract to an oxidation treatment.

6. In the process of making a debitterized extract of cascara sagrada or the like, in which the bark is macerated and percolated, the steps of fermenting, reducing the fermented mixture to dryness, making an aqueous extract from the residue, and aerating the extract.

7. In the process of making an extract of cascara sagrada, in which the bark is macerated with hot water and percolated, the steps of concentrating and fermenting the percolate, driving off the volatile constituents, and making an alkaline liquid extract from the residue.

8. The process of making an extract of cascara sagrada, which comprises making an aqueous extract of the same, fermenting the extract, evaporating the fermented mixture to drive off the volatile ingredients, adding water and an alkali to make the mixture alkaline, and oxidizing the mixture.

9. The process of making a debitterized extract of cascara sagrada or the like having substantially the same relative drug strength and cathartic properties as the bitter extract thereof, which comprises making an aqueous extract of the same, adding yeast and allowing the extract to ferment, reducing the fermented mixture to dryness to drive off the volatile ingredients, adding water in the proper amount to the dried mixture, adding a magnesium compound and sodium hydroxide, and oxidizing the mixture.

10. The process of making a debitterized extract of cascara sagrada or the like, which comprises macerating the bark and forming a liquid extract thereof, adding yeast and allowing the extract to ferment, reducing the fermented mixture to dryness to drive off the volatile ingredients, adding water and a magnesium compound and an alkali metal hydroxide to render the mixture alkaline and to aid in keeping the active principle in solution, and oxidizing the mixture.

11. In the process of making a debitterized liquid extract of cascara sagrada or the like, the steps of fermenting a mixture of the drug and water, preparing a liquid extract therefrom, and aerating the extract.

12. In the process of making a debitterized liquid extract of cascara sagrada or the like, the steps of fermenting a mixture of the drug and water, reducing the fermented mixture to dryness to eliminate the volatile ingredients, preparing an alkaline liquid extract of the drug, and oxidizing the extract.

13. In the process of making a debitterized extract of cascara sagrada or the like, in which a concentrated liquid extract is prepared from the percolate of the bark, the steps of fermenting the extract and submitting the fermented mixture to an oxidizing treatment, whereby the extract of the bark is substantially debitterized and the tendency toward griping when used physiologically is substantially removed.

14. The process of making an extract of cascara sagrada or the like, which comprises preparing a percolate of the bark, concentrating the percolate to form the desired strength of liquid extractive, adding yeast and fermenting the liquid extractive, reducing the fermented extractive to dryness, making an alkaline liquid extract from the residue, oxidizing the alkaline extract, and clarifying the same.

EDWARD D. DAVY.